(12) United States Patent
Weitzel et al.

(10) Patent No.: US 9,327,836 B2
(45) Date of Patent: May 3, 2016

(54) CABIN ATTENDANT SEAT, ARRANGEMENT COMPRISING A CABIN ATTENDANT SEAT AND AIRCRAFT AREA

(71) Applicant: Airbus Operations GmbH, Hamburg (DE)

(72) Inventors: Sebastian Weitzel, Hamburg (DE); Enrico Urban, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 0 days.

(21) Appl. No.: 14/256,150

(22) Filed: Apr. 18, 2014

(65) Prior Publication Data
US 2014/0224931 A1   Aug. 14, 2014

Related U.S. Application Data

(63) Continuation of application No. PCT/EP2012/070562, filed on Oct. 17, 2012.

(60) Provisional application No. 61/549,282, filed on Oct. 20, 2011.

(51) Int. Cl.
*B64D 11/06* (2006.01)
*B60N 2/48* (2006.01)

(52) U.S. Cl.
CPC ............ *B64D 11/06* (2013.01); *B60N 2/4838* (2013.01); *B64D 11/0627* (2014.12); *B64D 11/0691* (2014.12)

(58) Field of Classification Search
CPC .......... B64D 11/0602; B64D 11/0627; B64D 11/0629; B64D 11/0691; B64D 11/0698; B64D 11/06
See application file for complete search history.

(56) References Cited

U.S. PATENT DOCUMENTS

| | | | |
|---|---|---|---|
| 3,594,037 A * | 7/1971 | Sherman | 297/14 |
| 3,615,118 A | 10/1971 | Buxton | |
| 4,799,632 A | 1/1989 | Baymak et al. | |
| 5,029,942 A | 7/1991 | Rink | |
| 5,154,374 A * | 10/1992 | Beroth | 244/118.5 |
| 5,335,963 A | 8/1994 | Muller et al. | |
| 2006/0001307 A1 | 1/2006 | Embach | |
| 2006/0202085 A1* | 9/2006 | Schotte et al. | 244/119 |
| 2009/0206200 A1 | 8/2009 | Bolder et al. | |
| 2011/0253835 A1* | 10/2011 | Cook et al. | 244/118.5 |
| 2013/0313365 A1 | 11/2013 | Ehlers et al. | |

FOREIGN PATENT DOCUMENTS

| | | |
|---|---|---|
| DE | 3634839 A1 | 4/1988 |
| DE | 3629505 A1 | 11/1988 |

(Continued)

OTHER PUBLICATIONS

International Search Report, Jul. 1, 2013.

*Primary Examiner* — Tien Dinh
*Assistant Examiner* — Alexander V Giczy
(74) *Attorney, Agent, or Firm* — Greer, Burns & Crain Ltd.

(57) ABSTRACT

A cabin attendant seat including a carrier element which comprises a backrest section and a base section that carries the backrest section and a seat element fastened to a front side of the carrier element. At least one first stowage compartment is integrated into the carrier element. An inclined section of a rear wall of the carrier element is inclined, at least along a section of the first stowage compartment integrated into the carrier element, in such a way that a cross-sectional area of the carrier element increases in the direction of the base section of the carrier element.

15 Claims, 3 Drawing Sheets

(56) References Cited

FOREIGN PATENT DOCUMENTS

| DE | 4125958 C1 | 10/1992 |
| DE | 102005009750 A1 | 9/2006 |
| DE | 102008009938 A1 | 9/2009 |
| DE | 102010054942 A1 | 6/2012 |
| EP | 0372339 A2 | 6/1990 |
| JP | 10157566 A | 6/1998 |

* cited by examiner

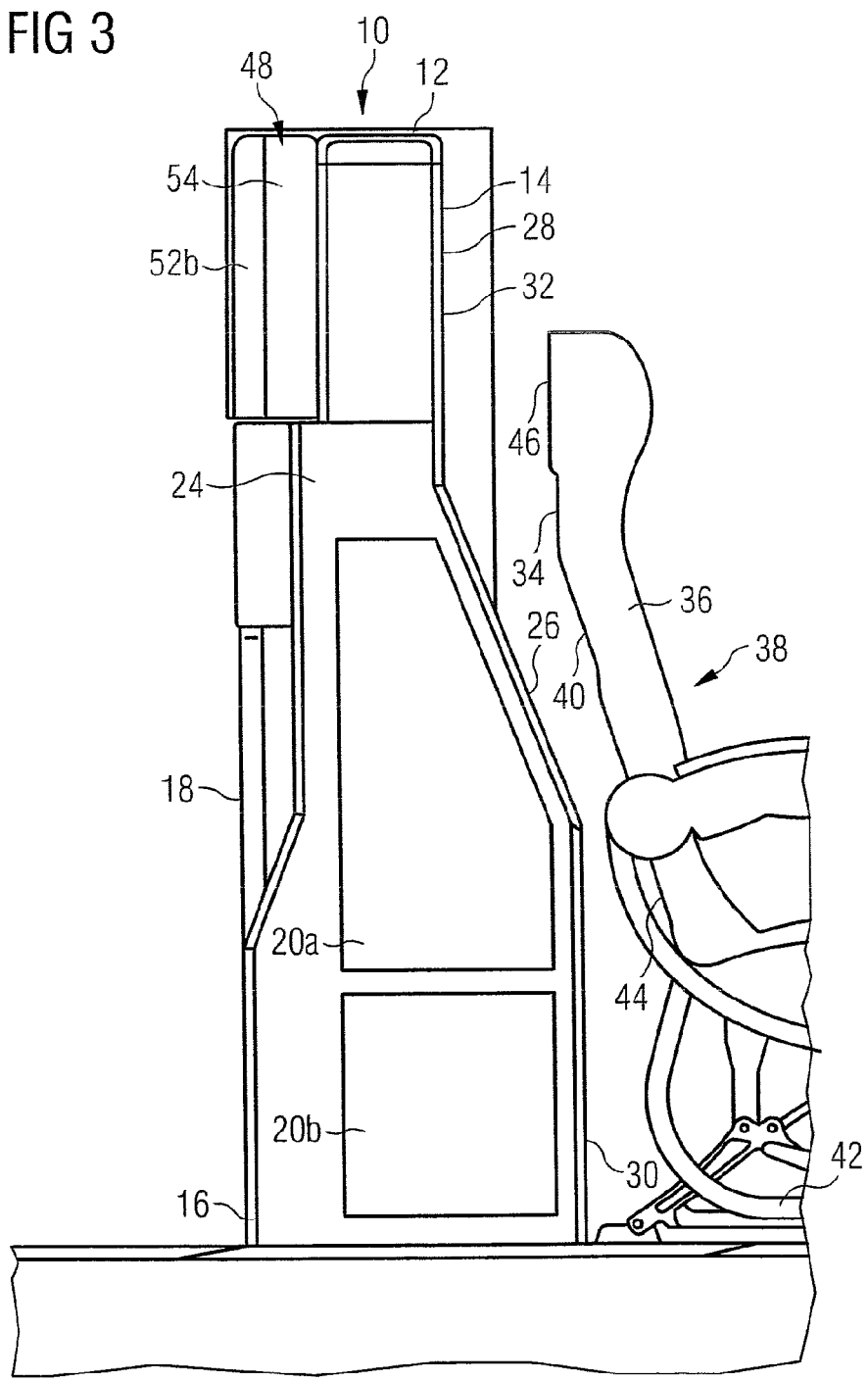

CABIN ATTENDANT SEAT, ARRANGEMENT COMPRISING A CABIN ATTENDANT SEAT AND AIRCRAFT AREA

CROSS-REFERENCES TO RELATED APPLICATIONS

This application is a continuation of International Application PCT/EP2012/070562 filed Oct. 17, 2012, designating the United States and published on Apr. 25, 2013 as WO 2013/057137. This application also claims the benefit of the U.S. Provisional Application No. 61/549,282, filed on Oct. 20, 2011, and of the German patent application No. 10 2011 116 519.7, filed on Oct. 20, 2011, the entire disclosures of which are incorporated herein by way of reference.

BACKGROUND OF THE INVENTION

The invention relates to a cabin attendant seat, to an arrangement comprising a cabin attendant seat and to an aircraft area.

The passenger cabin of a modern passenger aircraft is usually equipped with cabin attendant seats on which cabin attendants can take their place during takeoff and landing of the aircraft. Said cabin attendant seats are usually arranged in the door areas of the aircraft cabin. From DE 10 2008 009 938 A1, for example, a cabin attendant seat is known, the backrest of which borders on a side wall of a monument, for example a toilet module, and which has a folding seat element that is pivotable relative to the backrest. DE 10 2005 009 750 A1, on the other hand, discloses a cabin attendant seat having a folding seat element, the backrest of which is arranged adjacent to a backrest belonging to a passenger seat. The backrest of the cabin attendant seat is mounted on a base in a swivellable manner via a joint. The backrest of the cabin attendant seat can thus be pivoted, when the aircraft is in operating situations in which the cabin attendant seat is not in use, in a direction that faces away from the passenger seat. This permits unhindered adjustment of the backrest of the passenger seat.

Moreover, it is known, from DE 10 2008 009 938 A1, that it is desirable for items of emergency equipment, such as survival kits, to be stored, not in overhead luggage compartments arranged in the passenger cabin above the passenger seats, but in stowage compartments that are positioned in the door areas of the aircraft cabin. In an emergency, items of emergency equipment that are stowed in stowage compartments near the doors do not have to be first transported through the passenger cabin. Furthermore, the storage of items of emergency equipment in separate stowage compartments prevents said items from obstructing stowage space intended for the passengers' pieces of luggage.

A double cabin attendant seat arrangement which makes additional stowage space possible because of its structural design is likewise known from DE 3 634 839 A1.

SUMMARY OF THE INVENTION

The invention is directed at the object of indicating a cabin attendant seat which is so designed that it permits optimum utilization of the stowage space existing in the passenger cabin of an aircraft, for example for the purpose of accommodating items of emergency equipment. The invention is also directed at the object of providing an arrangement comprising a cabin attendant seat of this kind, and also an aircraft area in which a cabin attendant seat of this kind is arranged.

The cabin attendant seat according to the invention comprises a carrier element which comprises a backrest section and also a base section that carries said backrest section. When the cabin attendant seat is mounted in the passenger cabin of an aircraft, the base section of the carrier element faces towards a floor of the aircraft cabin, while the backrest section of the carrier element faces towards a ceiling of said aircraft cabin. Said carrier element may be provided with a suitable fastening device for fastening the cabin attendant seat to the floor of the aircraft cabin. The fastening device may, for example, be constructed so as to be complementary to a seat rail which is provided in the floor of the aircraft cabin, and may thus permit fastening of the cabin attendant seat in its position via the seat rails provided in said floor. As an alternative or in addition to this, however, it is also conceivable to provide the carrier element with a fastening device which permits fastening of the cabin attendant seat to the ceiling of the aircraft cabin.

A seat element is fastened to the carrier element. In particular, said seat element is fastened to a front side of the carrier element. The seat element is preferably designed as a folding seat element, that is to say, is attached to the carrier element so as to be pivotable between an inoperative position and a position of use. When the seat element is located in its inoperative position, it is preferably oriented substantially parallel to the backrest section of the carrier element, meaning that a seating surface of the seat element faces towards a front side of the backrest section of said carrier element. In its position of use, the seat element, with its seating surface, preferably extends substantially perpendicularly to the backrest section of the carrier element.

At least one first stowage compartment is integrated into the carrier element. However, the integration of a number of first stowage compartments into the carrier element is also conceivably possible, if required. The size and shape of the first stowage compartment is preferably chosen in such a way that items of emergency equipment, such as survival kits or the like, can be accommodated in said first stowage compartment. As a result of the integration of a first stowage compartment of this kind into the carrier element of the cabin attendant seat, it is no longer necessary to accommodate the items of emergency equipment in overhead luggage compartments arranged in the passenger cabin above the passenger seats and thereby obstruct stowage space intended for the passengers' pieces of luggage. Moreover, when they are mounted in the passenger cabin of an aircraft, cabin attendant seats are usually positioned in the area of the aircraft doors, so that items of emergency equipment that are received in a first stowage compartment integrated into a carrier element of a cabin attendant seat do not have to be first transported through the passenger cabin to the aircraft doors in an emergency.

A section of a rear wall of a carrier element is inclined, at least along a section of the stowage compartment integrated into said carrier element, in such a way that a cross-sectional area of said carrier element increases in the direction of the base section of said carrier element. In other words, at least along a section of the stowage compartment integrated into the carrier element, the cross-sectional area of said carrier element diminishes continuously or in stages in the direction of an upper end of the latter, and the upper end faces towards the ceiling of the passenger cabin when the cabin attendant seat is mounted in the passenger cabin of an aircraft. Such a construction of the carrier element permits optimum utilization of the stowage space, particularly if the cabin attendant seat is positioned, when mounted in the passenger cabin of an aircraft, in such a way that the rear wall of its carrier element faces towards a rear side of a backrest belonging to a passenger seat.

The shape of the rear wall of the carrier element is preferably adapted to the shape of a rear side of a backrest of a passenger seat, and has, in particular, a first straight section which borders, in the direction of the base section of the carrier element, on the inclined section of the rear wall of said carrier element, and a second straight section which borders, in the direction of the backrest section of the carrier element, on said inclined section of the rear wall of the carrier element.

The first stowage compartment that is integrated into the carrier element of the cabin attendant seat is preferably accessible through at least one aperture which is constructed in at least one side wall of said carrier element. The aperture may be closed off by a suitable cover. If desired, it is also possible to construct, in the side wall of the carrier element, a number of apertures through which the first stowage compartment is accessible. Furthermore, it is conceivable to provide both the mutually opposed side walls of the carrier element with suitable apertures, which each allow access to the first stowage compartment that is integrated into the carrier element of the cabin attendant seat.

Said cabin attendant seat preferably also comprises a head rest that is fastened to the carrier element in a pivotable manner. At least one second stowage compartment may be integrated into the carrier element in the area of the head rest. The second stowage compartment is preferably accessible by pivoting the head rest relative to the carrier element. The size and shape of the second stowage compartment may, once again, be chosen in such a way that said second stowage compartment is suitable for accommodating items of emergency equipment. The head rest is preferably fastened to the carrier element in a pivotable manner in such a way that said head rest is foldable upwards, in the direction of the ceiling of the passenger cabin when the cabin attendant seat is mounted in the passenger cabin of an aircraft, or downwards, in the direction of the floor of the passenger cabin when said cabin attendant seat is mounted in the passenger cabin of an aircraft.

The cabin attendant seat may be constructed as a double seat and may comprise only one second stowage compartment which extends over substantially the entire width of the carrier element. Said second stowage compartment is then also suitable for receiving larger items, in particular items of emergency equipment.

The head rest of the cabin attendant seat preferably comprises a head cushion which is fastened to a base element of said head rest in a pivotable manner. There may be integrated into the head rest at least one third stowage compartment which is accessible by pivoting the head cushion relative to the base element of the head rest. The integration of a third stowage compartment into the head rest of the cabin attendant seat provides further stowage space for accommodating items. The head cushion is preferably fastened to the base element of the head rest in a pivotable manner in such a way that said head cushion can be folded upwards, in the direction of the ceiling of the passenger cabin when the cabin attendant seat is mounted in the passenger cabin of an aircraft, or downwards, in the direction of the floor of the passenger cabin when said cabin attendant seat is mounted in the passenger cabin of an aircraft, in order to make said third stowage compartment accessible.

Particularly, if the cabin attendant seat is constructed as a double seat, said cabin attendant seat may comprise two head cushions that are pivotable independently of one another, relative to the base element of the head rest. The head cushions may then make accessible a third, large-volume stowage compartment which extends over substantially the entire width of the carrier element. As an alternative to this, however, it is also possible to provide two third stowage compartments which can each be made accessible, independently of one another, by pivoting a head cushion relative to the base element of the head rest.

An arrangement according to the invention comprises a cabin attendant seat, which has been described above. Said arrangement also comprises a passenger seat which is positioned, relative to the cabin attendant seat, in such a way that the rear wall of the carrier element of said cabin attendant seat faces towards the rear side of the backrest of the passenger seat.

The passenger seat may be equipped with a backrest that is adjustable between an upright position and a reclined position. The cabin attendant seat and the passenger seat are then preferably positioned, relative to one another, in such a way that a predetermined safety gap is still present between the rear wall of the carrier element of the cabin attendant seat and the backrest of the passenger seat, even when said backrest of the passenger seat is in its reclined position. With the arrangement configured in such a way, unrestricted functionality of the passenger seat, and thereby unrestricted convenience for a passenger sitting on said passenger seat, is guaranteed, even though the passenger seat forms an arrangement according to the invention jointly with the cabin attendant seat.

The inclined section of the rear wall of the carrier element of the cabin attendant seat preferably extends substantially parallel to an inclined section of the rear side of the backrest of the passenger seat.

On the other hand, the first straight section of the rear wall of the carrier element of the cabin attendant seat preferably extends substantially parallel to a substantially vertical section of a carrier and also to a section of the rear side of the backrest of the passenger seat that borders on said carrier. That section of the rear side of the backrest of the passenger seat which borders on the carrier reaches approximately as far as the armrests which are provided on said passenger seat.

The second straight section of the rear wall of the carrier element of the cabin attendant seat preferably extends substantially parallel to a substantially straight head rest section of the rear side of the backrest of the passenger seat.

An aircraft area according to the invention, which may constitute part of an aircraft passenger cabin, comprises an aircraft door and a passageway that extends in the direction of said aircraft door. An assist space borders on the passageway and extends along a section of the latter. Said assist space is so positioned and dimensioned that a person can stand upright in it. The aircraft area also comprises a main aisle which extends substantially perpendicularly to the passageway. A cabin attendant seat which has been described above is positioned in the aircraft area in such a way that its side walls border on the assist space and the main aisle respectively. With the cabin attendant seat arranged in such a way, apertures which are provided in the side walls of the carrier element of said cabin attendant seat and through which the first stowage compartment integrated into the carrier element of said cabin attendant seat is accessible, can be reached particularly easily.

The aircraft area also preferably comprises a passenger seat which is positioned, relative to the cabin attendant seat, in such a way that the rear wall of the carrier element of said cabin attendant seat faces towards the rear side of the backrest of the passenger seat.

BRIEF DESCRIPTION OF THE DRAWINGS

A preferred embodiment of the invention will now be explained in greater detail with the aid of the appended schematic drawings, in which:

FIG. 3 shows a side view of the cabin attendant seat which is illustrated in FIGS. 1 and 2 and which forms, with a passenger seat, a cabin attendant seat/passenger seat arrangement.

DETAILED DESCRIPTION OF THE PREFERRED EMBODIMENTS

Figure 1:
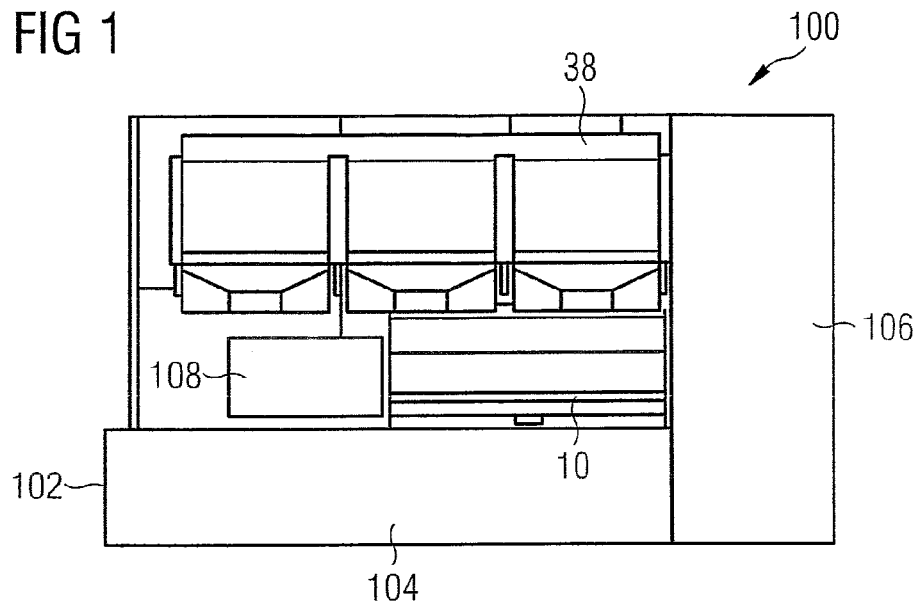
FIG. 1 shows a plan view of an aircraft area in which a cabin attendant seat is arranged.

An aircraft area 100 illustrated in FIG. 1 comprises an aircraft door 102 and a passageway 104, which extends from a main aisle 106 in the direction of the door 102 in a manner substantially perpendicular to said main aisle 106. Bordering on the passageway 104 is an assist space 108, which is so dimensioned and arranged that a person can stand upright in it. Said assist space 108 extends over a partial section of the passageway 104. Also provided in the aircraft area 100 is a cabin attendant seat 10, which is constructed as a double seat.

As can be seen most clearly in FIGS. 1 and 3, the cabin attendant seat 10 comprises a carrier element 12, which comprises a backrest section 14 and a base section 16 that carries said backrest section 14. Fastened to a front side of the carrier element 12 is a seat element 18, which is designed as a folding seat element. In FIGS. 1 and 3, said seat element 18 is represented in its inoperative position, in which it is oriented substantially parallel to the backrest section 14 of the carrier element 12.

Integrated into the carrier element 12 are two first stowage compartments 20a, 20b. Said first stowage compartments 20a, 20b are each accessible through apertures constructed in side walls 22, 24 of the carrier element 12. The apertures are accessible by means of suitable covering elements that may be designed, for example, in the form of covering flaps or the like. Since the cabin attendant seat 10 is positioned in the aircraft area 100 in such a way that its side walls 22, 24 border on the assist space 108 and the main aisle 106, respectively, the first stowage compartments 20a, 20b are conveniently accessible both from the assist space 108 and from the main aisle 106.

The first stowage compartments 20a, 20b are so dimensioned and shaped that they are suitable for receiving items of emergency equipment. It is also possible, however, to accommodate other items in said first stowage compartments 20a, 20b. However, items of emergency equipment are particularly suitable for accommodation in the first stowage compartments 20a, 20b, since they are needed in the area of the aircraft door 102 in an emergency. By arranging them in said first stowage compartments 20a, 20b, it is possible to avoid transporting them through the passenger cabin of the aircraft to the door 102 of the latter.

Along a section of the upper, first stowage compartment 20a that is integrated into the carrier element 12, a section 26 of a rear wall 28 of the carrier element 12 is inclined in such a way that a cross-sectional area of said carrier element 12, and with it a cross-sectional area of said first stowage compartment 20a, increases along the inclined rear wall section 26 in the direction of the base section 16 of the carrier element 12. Moreover, the rear wall 28 of the carrier element 12 has a first straight section 30 which borders, in the direction of the base section 16 of the carrier element 12, on the inclined rear wall section 26, and also a second straight section 32 which borders, in the direction of the backrest section 14 of the carrier element 12, on said inclined rear wall section 26.

Figure 2:
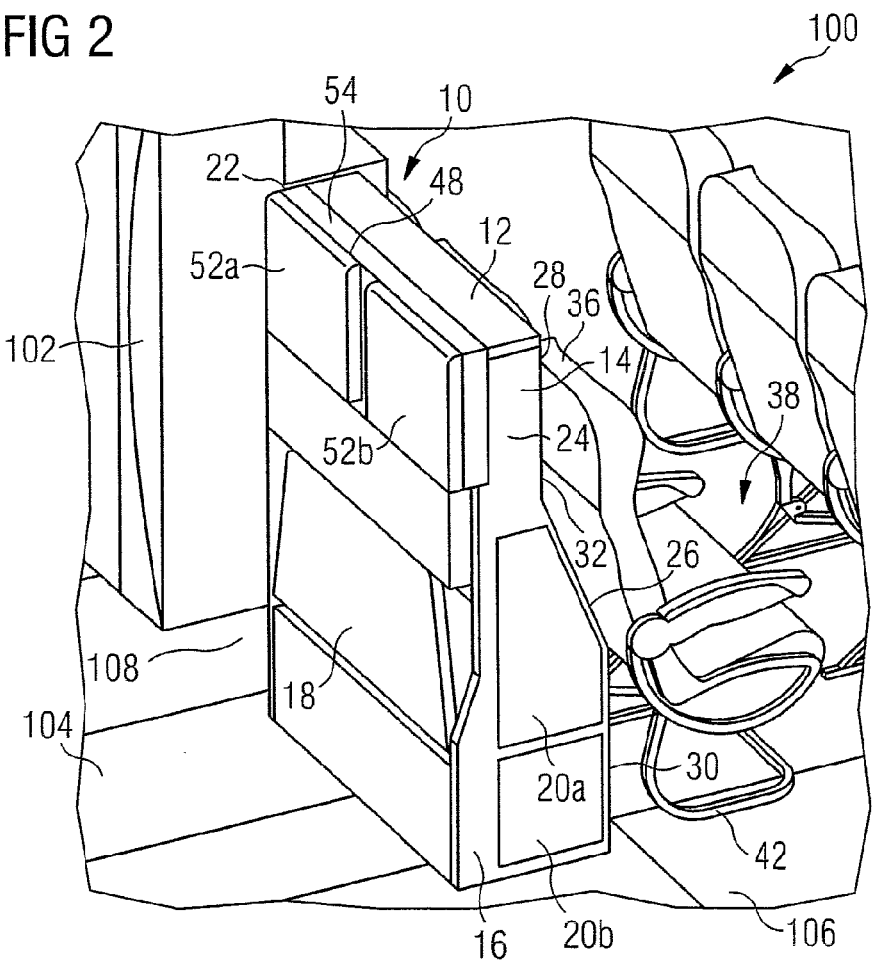
FIG. 2 shows a three-dimensional representation of the aircraft area according to FIG. 1.

As can be seen most clearly in FIGS. 2 and 3, the rear wall 28 of the carrier element 12 is adapted, by configuring it in such a way with two straight sections 30, 32 and an inclined section 26, to the shape of a rear side 34 of a backrest 36 belonging to a passenger seat 38 which is positioned in such a way, relative to the cabin attendant seat 10, that the rear wall 28 of the carrier element 12 of said cabin attendant seat 10 faces towards the rear side 34 of the backrest 36 of the passenger seat 38. In particular, the inclined section 26 of the rear wall 28 of the carrier element 12 extends substantially parallel to a section 40, which is likewise inclined, of the rear side 34 of the backrest of the passenger seat 38. On the other hand, the first straight section 30 of the rear wall 28 of the carrier element extends substantially parallel to a substantially vertical section of a carrier 42, which is constructed in the form of a carrying framework, and also to a section 44 of the rear side 34 of the backrest of the passenger seat 38 that borders on the substantially vertical section of said carrier 42. Finally, the second straight section 32 of the rear wall 28 of the carrier element is oriented substantially parallel to a substantially straight head rest section 46 of the rear side 34 of the backrest of the passenger seat 38.

The backrest 36 of the passenger seat 38 can be adjusted between an upright position and a reclined position. However, the cabin attendant seat 10 and the passenger seat 38 are positioned, relative to one another, in such a way that a predetermined safety gap is still present between the rear wall 28 of the carrier element 12 of the cabin attendant seat 10 and the rear side 34 of the backrest 36 of the passenger seat 38, even when said backrest 36 of the passenger seat 38 is in its reclined position. The cabin attendant seat 10 and the passenger seat 38 thus form an arrangement which permits optimum utilization of the space available in the passenger cabin of an aircraft, without any restrictions on the functionality of the passenger seat 38, and thereby any restriction on the convenience of a passenger sitting on said passenger seat 38, occurring.

Figure 4A:
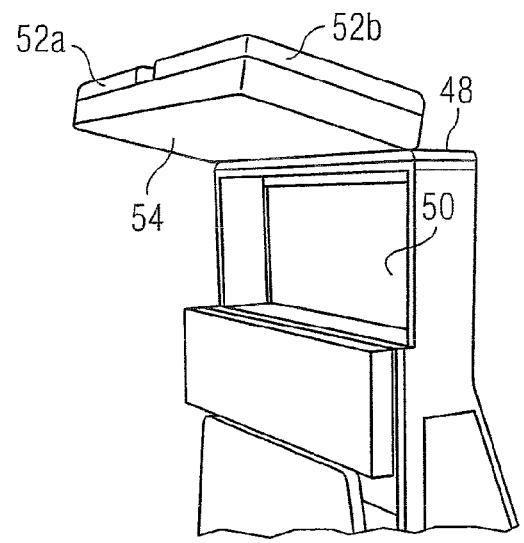
FIGS. 4a and 4b show detail representations of a head rest belonging to the cabin attendant seat according to FIGS. 1 to 3.
Figure 4B:
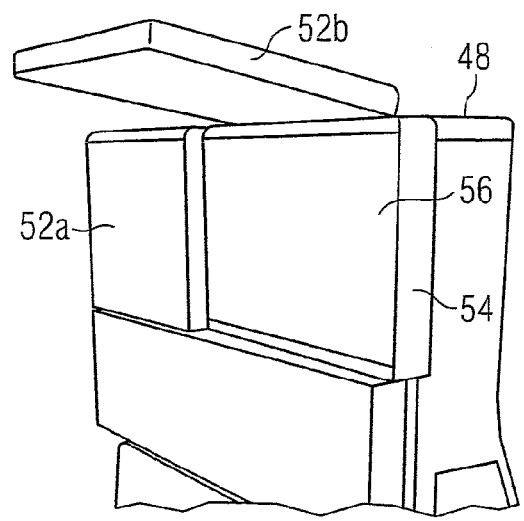

The cabin attendant seat 10 also comprises a head rest 48 (see particularly FIGS. 4a and 4b). Said head rest 48 is fastened to the carrier element 12 in a pivotable manner. Integrated into the carrier element 12 in the area of the head rest 48 is a second stowage compartment 50 which extends over substantially the entire width of the carrier element 12. The second stowage compartment 50 which is integrated into the carrier element 12 in the area of the head rest 48 is made accessible by pivoting said head rest 48 (see FIG. 4a).

The head rest 48 comprises two head cushions 52a, 52b that can each be pivoted independently of one another, relative to a base element 54 of said head rest 48. An interphone may be provided between the head cushions 52a, 52b. Integrated into the head rest 48 are two third stowage compartments 56 which are accessible, independently of one another, by pivoting the head cushions 52a, 52b relative to the base element 54 of said head rest 48. The second stowage compartment 50 and the third stowage compartments 56 may, like the first stowage compartments 20a, 20b, be used for accommodating items of emergency equipment. Finally, the cabin attendant seat 10 is equipped with a safety belt.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

The invention claimed is:

1. A cabin attendant seat comprising:
a carrier element which comprises a backrest section and a base section that carries said backrest section; and
a seat element fastened to a front side of said carrier element,
wherein at least one first stowage compartment is integrated into the carrier element, an inclined section of a rear wall of the carrier element being inclined, at least along a section of the first stowage compartment integrated into said carrier element, in such a way that a cross-sectional area of said carrier element increases in the direction of the base section of said carrier element,
wherein the shape of the inclined section of the rear wall of the carrier element is permanently adapted to the shape of a rear side of a backrest of a passenger seat in an inclined position.

2. The cabin attendant seat according to claim 1,
wherein the shape of the rear wall of the carrier element has a first straight section which borders, in the direction of the backrest section of the carrier element, on the inclined section of the rear wall of said carrier element, and a second straight section, substantially parallel to the first straight section, which borders, in the direction of the base section of the carrier element, on said inclined section of the rear wall of said carrier element.

3. The cabin attendant seat according to claim 1,
wherein the first stowage compartment is accessible through at least one aperture which is constructed in at least one side wall of the carrier element.

4. The cabin attendant seat according to claim 1,
further comprising a head rest which is fastened to the carrier element in a pivotable manner, there being integrated into said carrier element, in an area of the head rest, at least one second stowage compartment which is accessible by pivoting said head rest relative to the carrier element.

5. The cabin attendant seat according to claim 4,
wherein said cabin attendant seat is constructed as a double seat and comprises only one second stowage compartment which extends over substantially the entire width of the carrier element.

6. The cabin attendant seat according to claim 4,
wherein the head rest comprises a head cushion which is fastened to a base element of said head rest in a pivotable manner, there being integrated into the head rest at least one third stowage compartment which is accessible by pivoting the head cushion relative to the base element of the head rest.

7. The cabin attendant seat according to claim 6,
wherein the cabin attendant seat is constructed as a double seat and comprises two head cushions that are pivotable independently of one another, relative to the base element of the head rest.

8. The cabin attendant seat according to claim 1, wherein the inclined section of the rear wall of the carrier element of the cabin attendant seat extends substantially parallel to an inclined section of the rear side of the backrest of the passenger seat.

9. An arrangement comprising:
a cabin attendant seat comprising:
a carrier element which comprises a backrest section and a base section that carries said backrest section; and
a seat element fastened to a front side of said carrier element; and
a passenger seat which is positioned, relative to the cabin attendant seat, in such a way that the rear wall of the carrier element of said cabin attendant seat faces towards the rear side of the backrest of the passenger seat,
wherein at least one first stowage compartment is integrated into the carrier element, an inclined section of a rear wall of the carrier element being inclined, at least along a section of the first stowage compartment integrated into said carrier element, in such a way that a cross-sectional area of said carrier element increases in the direction of the base section of said carrier element,
wherein the shape of the inclined section of the rear wall of the carrier element is permanently adapted to the shape of a rear side of a backrest of the passenger seat in an inclined position.

10. The arrangement according to claim 9,
wherein the passenger seat is equipped with a backrest which is adjustable between an upright position and a reclined position, and the cabin attendant seat and the passenger seat are positioned, relative to one another, in such a way that a predetermined safety gap is present between the rear wall of the carrier element of the cabin attendant seat and the rear side of the backrest of the passenger seat, even when said backrest of the passenger seat is in a reclined position.

11. The arrangement according to claim 9,
wherein the inclined section of the rear wall of the carrier element of the cabin attendant seat extends substantially parallel to an inclined section of the rear side of the backrest of the passenger seat.

12. The arrangement according to claim 9,
wherein a first straight section of the rear wall of the carrier element of the cabin attendant seat extends substantially parallel to a section of a carrier of the passenger seat and also to a section of the rear side of the backrest of the passenger seat that borders on said carrier.

13. The arrangement according to claim 9,
wherein a second straight section of the rear wall of the carrier element of the cabin attendant seat extends substantially parallel to a substantially straight head rest section of the rear side of the backrest of the passenger seat.

14. An aircraft area having:
an aircraft door;
a passageway which extends in the direction of said aircraft door;
an assistance space which borders on the passageway and extends along a section of said passageway;
a main aisle which extends substantially perpendicularly to the passageway; and
a cabin attendant seat, which is positioned in the aircraft area in such a way that side walls of the cabin attendant seat border on the assistance space and the main aisle respectively, comprising:
a carrier element which comprises a backrest section and a base section that carries said backrest section; and
a seat element fastened to a front side of said carrier element,
wherein at least one first stowage compartment is integrated into the carrier element, a section of a rear wall of the carrier element being inclined, at least along a section of the first stowage compartment integrated into said carrier element, in such a way that a cross-sectional area of said carrier element increases in the direction of the base section of said carrier element, wherein the shape of the inclined section of the rear wall of the carrier element is permanently adapted to the shape of a rear side of a backrest of the seat element in an inclined position.

15. The aircraft area according to claim 14, further comprising a passenger seat which is positioned, relative to the cabin attendant seat, in such a way that the rear wall of the carrier element of the cabin attendant seat faces towards the rear side of the backrest of the passenger seat.

\* \* \* \* \*